(12) United States Patent
Blerkom

(10) Patent No.: US 7,804,536 B2
(45) Date of Patent: *Sep. 28, 2010

(54) VARIABLE PIXEL CLOCK ELECTRONIC SHUTTER CONTROL

(75) Inventor: Daniel Van Blerkom, Altadena, CA (US)

(73) Assignee: Aptina Imaging Corporation, Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 12/418,802

(22) Filed: Apr. 6, 2009

(65) Prior Publication Data

US 2009/0201407 A1 Aug. 13, 2009

Related U.S. Application Data

(60) Continuation of application No. 11/318,512, filed on Dec. 28, 2005, now Pat. No. 7,528,873, which is a division of application No. 10/202,622, filed on Jul. 22, 2002, now Pat. No. 7,084,914.

(60) Provisional application No. 60/306,744, filed on Jul. 20, 2001.

(51) Int. Cl.
*H04N 5/335* (2006.01)

(52) U.S. Cl. .................................... 348/296

(58) Field of Classification Search ............... 348/296, 348/294, 207.99, 302, 308, 229.1, 230.1, 348/297, 298; 250/208.1
See application file for complete search history.

(56) References Cited

U.S. PATENT DOCUMENTS

| 5,471,515 | A | 11/1995 | Fossum et al. | |
|---|---|---|---|---|
| 5,767,904 | A | 6/1998 | Miyake | |
| 5,793,422 | A * | 8/1998 | Mochizuki et al. | 348/296 |
| 6,278,490 | B1 | 8/2001 | Fukuda et al. | |
| 6,529,242 | B1 | 3/2003 | Panicacci | |
| 6,580,456 | B1 * | 6/2003 | Jacobs | 348/312 |
| 6,809,766 | B1 | 10/2004 | Krymski et al. | |
| 6,847,398 | B1 | 1/2005 | Fossum | |
| 6,937,277 | B1 * | 8/2005 | Hattori et al. | 348/304 |
| 2001/0005225 | A1 * | 6/2001 | Clark et al. | 348/302 |
| 2002/0080263 | A1 | 6/2002 | Krymski | |
| 2002/0113886 | A1 | 8/2002 | Hynecek | |
| 2002/0175954 | A1 | 11/2002 | Pearson | |
| 2005/0057674 | A1 | 3/2005 | Krymski et al. | |

* cited by examiner

*Primary Examiner*—Jason Chan
*Assistant Examiner*—Nicholas G Giles
(74) *Attorney, Agent, or Firm*—Dickstein Shapiro LLP

(57) ABSTRACT

CMOS image sensor with a rolling shutter that uses two separate clocks. One of the clocks is used during normal operation. When timing is changed, the other clock is started and used during an interim period to avoid distortion in the image. After that interim period, the new clock timing is coupled to the original clock circuit.

18 Claims, 2 Drawing Sheets

Time

Time

VARIABLE PIXEL CLOCK ELECTRONIC SHUTTER CONTROL

CROSS-REFERENCE TO RELATED APPLICATIONS

This application is a continuation of application Ser. No. 11/318,512, filed Dec. 28, 2005 now U.S. Pat. No. 7,528,873, which is a divisional of application Ser. No. 10/202,622, filed Jul. 22, 2002, now U.S. Pat. No. 7,084,914, issued Aug. 1, 2006, which claims benefit of U.S. Provisional Application No. 60/306,744, filed on Jul. 20, 2001, which are hereby incorporated by reference in their entireties.

BACKGROUND

CMOS image sensors are described in U.S. Pat. No. 5,471,515. Almost all commercial CMOS imagers rely on a rolling shutter to establish the integration time for the captured image. This contrasts with typical CCD systems, in which a full frame shutter is used to capture the image. A rolling shutter establishes staggered integration times for respective rows of the image. Each row has the same integration time, but each row starts integration and ends its integration at different staggered time. Hence, the time of the row integration, or "shutter" is rolling.

FIG. 1 shows a block diagram of a typical CMOS image sensor of this type. The sensor includes an array 150 of photoreceptors which are arranged into rows such as 1, 2 and 3. Each of the photoreceptors include in-pixel switches such as 152 which are controlled by a control circuitry 160. The control circuitry provides control signals to the various pixels. For example, an entire row of pixels such as row 1 may be controlled all at the same time such that the entire row begins integrating and the same time, and ends integrating and is read out also at the same time.

FIG. 2A shows a diagram of the operation of such a rolling shutter. The x axis in FIG. 2a represents time, while the y axis represents different rows. It can be seen that row 1 starts at time 100 and ends at time 102. Similarly, integration within row 2 starts at time 104 which is some time interval t after time 100. Integration of row 2 ends at 106 which is after 102. The integration time for each of these rows is the same, even though the start and time for each of these rows may be different.

In order to do this, the CMOS sensor logic 160 establishes two row pointers called the readout pointer and the shutter pointer. The start of each row readout time is established by the shutter pointer. This causes the specified row to be reset, and then to begin integration. The readout pointer is used to determine which row of pixels will be sampled and output. FIG. 2a shows the shutter pointers as the leftmost dots such as 100, and the readout pointers as the rightmost dots such as 102. For example, the dots that start and end the eighth vertical dotted lines, labeled as 8 in FIG. 1 occur at the same time that row 3 is being read out.

Various conditions may make it desirable to slow the output frame rate of the CMOS image sensor. This may be caused by limits in bandwidth, limits in the ability to compress the video, or low light conditions requiring longer integration times. For example, this scene may change to become more or less complicated and thus take more or less time to compress. Alternatively, battery conditions may necessitate a situation where power needs to be conserved. This may make it desirable to change the system clock.

There are known ways of slowing the output using this rolling shutter.

A first way is to maintain the output data rate, but to add a vertical blanking time to the output data stream. This produces a burst of data at the time of the active rows. During the vertical blanking period, there is a long absence of data, however. In many systems, this may be difficult because the burst data rate will need to be buffered to match the slower data rate at a later point in the system.

A more direct technique of slowing the output data rate is to slow the master clock frequency of the CMOS image sensor to thereby slow the output data rate and the frame rate. This effectively outputs the data at that slower rate. However, this can corrupt the output image frames during the time while the clock change is occurring. The corruption of data occurs because the sensor logic is operating on both the current frame and the next frame simultaneously. Therefore, there is no single instant when a master clock change will not result in either the current frame or the next frame having rows with different integration times. The system therefore compensates, but doing so may require dropping corrupted frames. This can effect the video output during those corrupted frames.

Another method is to request the image sensor to change its output data rate. This has similar problems to those described above.

SUMMARY

The present application teaches a system that allows data output rate changes with compensation for the data rate change.

BRIEF DESCRIPTION OF THE DRAWINGS

These and other aspects will now be described in detail with reference to the accompanying drawings, wherein.

DETAILED DESCRIPTION

Figure 1:
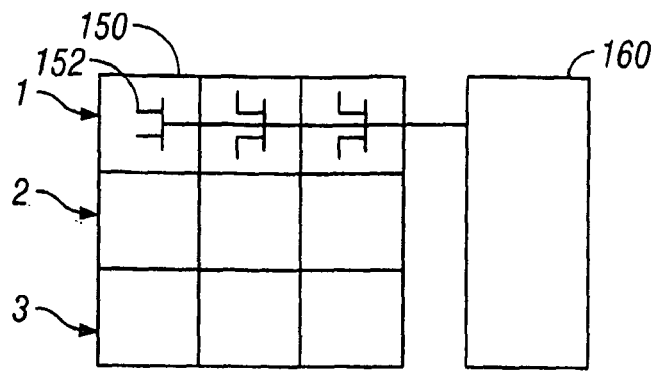
FIG. 1 shows a block diagram of a CMOS image sensor.
Figure 2A:
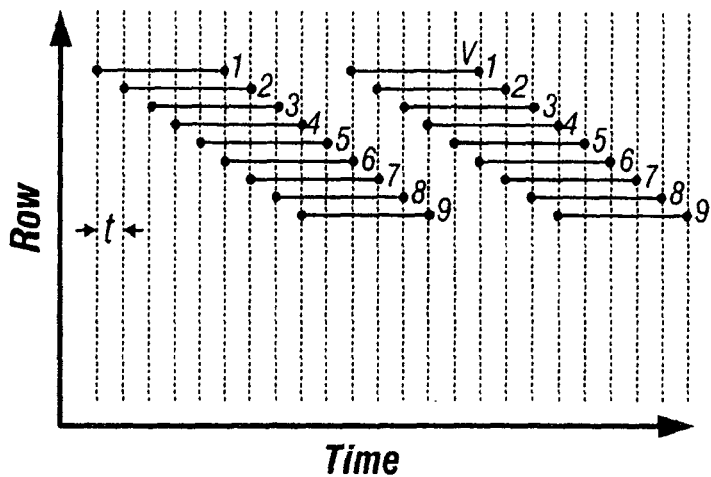
FIGS. 2a and 2b show depictions of rolling shutters that two different timing intervals.
Figure 2B:
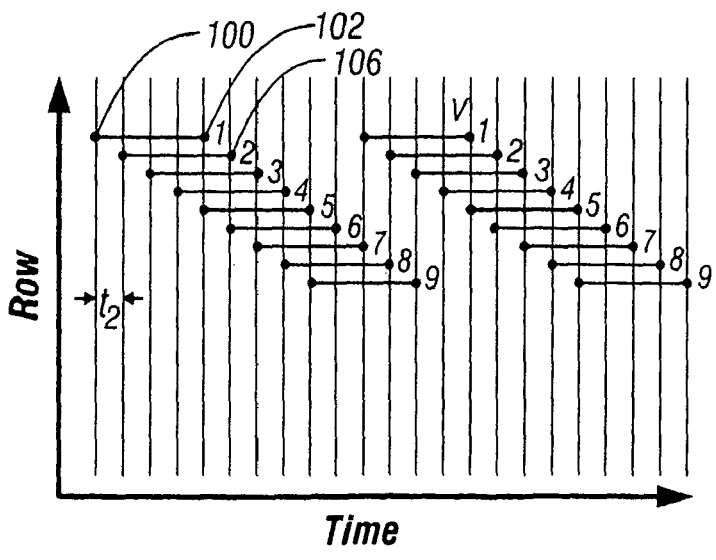

FIG. 2B shows an example situation of a rolling shutter that is slower than the shutter in FIG. 2A. The techniques disclosed herein enable switching between these two different clock techniques. In FIG. 2B, the pixel clock, and thus the row time and frame rate, is slower than that in FIG. 2A by a ratio of 5:4. However, each row is integrated for the same amount of time in FIGS. 2A and 2B. Therefore, the interval "t2" in FIG. 2B is different than the interval "t" in FIG. 2A.

A camera system might have a goal of switching between the settings in FIG. 2a and the settings in FIG. 2b, in order to match the sensor output data bandwidth to the system bandwidth while maintaining the same exposure settings.

Figure 3:
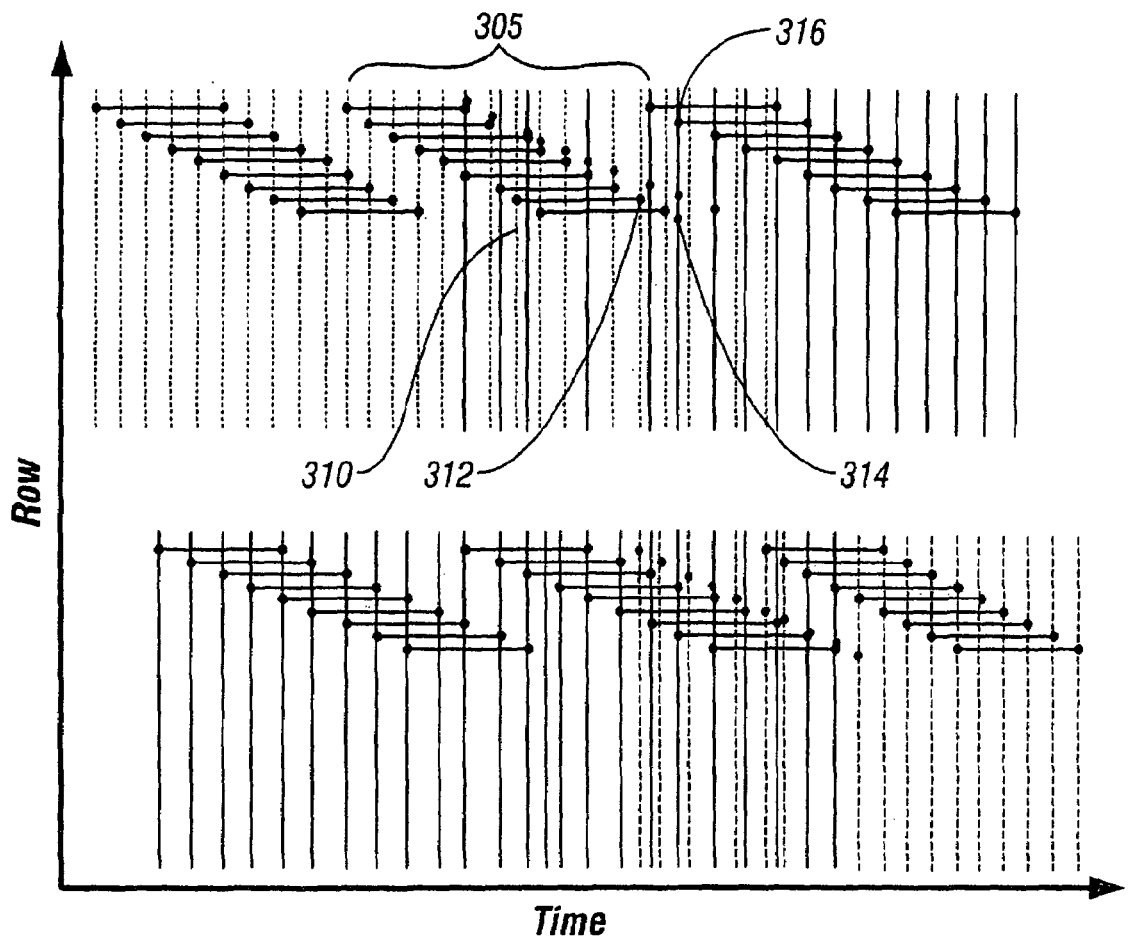
FIG. 3 shows a switching system between the FIG. 2a and 2b systems.
Figure 4:
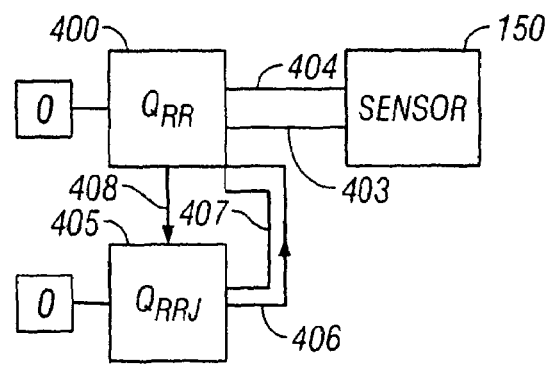
FIG. 4 shows a block diagram of the special clocks.

FIG. 3 shows a timing diagram of the technique that is used according to the present system to seamlessly switch between the settings in FIGS. 2a and 2b. This is done without causing corruption of the image stream. FIG. 3 shows there is a period of overlap during which both the old and new pixel clocks are used to set the timing. FIG. 4 shows the two modules; the row read module 400 and row read jump module 405, which are used to create the corruption-free switching between the pixel clocks. These two modules operate with individually controllable pixel clock speeds.

The row read module 400 controls the row read and reset functions for the current pixel clock speed of the image. The row read jumping block, in contrast, controls the row reset for a new pixel clock speed. When no pixel clock speed change is required, the row read jumping block is disabled. However, the two modules can operate at different pixel clock speeds simultaneously, since each block includes its own pixel clock generation circuit. The row read jumping block 405 is effectively a replica of the row read block 400, with its row read functionality removed.

In order to enable the row read jumping block, the readout pointer is set at the top of its current frame plus an offset, as described below the enable line 408 is activated at this time. In operation, a setting change has been requested. The jump shutter pointer 406, which is the dual of the shutter pointer 404 in the row read block, begins to output resets for rows when it has wrapped to the next frame. When the shutter pointer 404 reaches the end of the current frame, it is disabled. Thereafter, when the readout pointer 403 reaches the start of the new frame, the row read jumping module 405 is disabled, and the row read block 400 is updated with the new settings 406, 407. Thus, both clocks 403, 404, 406, 407 operate simultaneously, for the time of a single frame. Effectively, the new clock is used during the transition time. 305 is used to set the time for the next integration. For example, for line 310 shown in FIG. 3, during a normal clock, the next integration would start at the time 312. During the interim integration, however, the second clock produces new ending times different than starting time 314. Hence, the next integration 316 starts at the same time as the ending clock 314.

When switching from a slower pixel clock frequency to a faster pixel clock frequency, an offset must be added to the start of the new pixel clock frame to avoid wrapping the new frame on top of the old frame and thus corrupting the old frame. This offset is labeled as D, and can be determined as $$D = W \frac{Pold - Pnew}{Pold}$$

where W is the number of rows in the frame including vertical blanking rows, $P_{old}$ is the current pixel clock speed, and $P_{new}$ is the new faster pixel clocks the given both in terms of master clock cycles. This operation can be implemented in code as shown in the code segment below. This can be done using this code segment without a division operation.

```
-- DVB 3/31/00: This process calculates approximately how many lines to delay
-- before starting the jump integration module. When the readcount
-- is equal to the value of comparecnt, the jump module is started.
-- The actual equation should be
--      CompareCnt = AllWidth * (pclk - pclk_jump) / pclk
-- where pclk is the # of clocks per pixclk
-- The approximation implemented here is
--      CompareCnt = AllWidth / 2 ^ (log2(pclk) - log2 (pclk-pclk_jump))
-- where log2 is really INT (log2( ))
process (pixclk_speed_local, pixclk_speed_jump_local)
begin
      var_pc <= To_StdLogicVector (pixclk_speed_local) + "00010";
      var_pc_d <= To_StdLogicVector (pixclk_speed_local) -
To_StdLogicVector (pixclk_speed_jump_local);
   end process;
process (var_pc, var_pc_d, var_log_pc, var_log_pc_d)
begin
      if (sl2i (var_pc) >= 16) then
            var_log_pc <= 4;
      elsif (sl2i (var_pc) >= 8) then
            var_log_pc <= 3;
      elsif (sl2i (var_pc) >= 4) then
            var_log_pc <= 2;
      else
            var_log_pc <= 1;
      end if;
      if (s12i (var_pc_d) >= 16) then
            var_log_pc_d <= 4;
      elsif (s12i (var_pc_d) >= 8) then
            var_log_pc_d <= 3;
      elsif (s12i (var_pc_d) >= 4) then
            var_log_pc_d <= 2;
      elsif (s12i (var_pc_d) >= 2) then
            var_log_pc_d <= 1;
      else
            var_log_pc_d <= 0;
      end if;
      var_sr <= var_log_pc - var_log_pc_d;
end process;
process (AllWidth_out)
begin
   AW(0) <= To_BitVector (To_StdLogicVector (AllWidth_out) -2);
   AW(1) <= '0' & AllWidth_out (10 downto 1);
   AW(2) <= "00" & AllWidth_out (10 downto 2);
   AW(3) <= "000" & AllWidth_out (10 downto 3);
   AW(4) <= "0000" & AllWidth_out (10 downto 4);
end process
process (AW, var_sr, pixclk_speed_jump_local, pixclk_speed_local)
```

```
begin
    if ieee.std_logic_unsigned. ">=" (To_StdLogicVector (pixclk_speed_jump_local),
            To_StdLogicVector (pixclk_speed_local)) then
        CompareCnt <= "00000000000";
    else
CompareCnt <= AW (var_sr);
    end if;
end process;
```

Since the row read and row read jumping modules can operate asynchronously, they could potentially overlap reset functions which could also result in image corruption. To avoid this, the row read and row read jumping modules include a handshaking mechanism. This avoids the modules simultaneously issuing reset requests to the pixel array row driver logic.

This technique also works for the simpler situation of exposure changes with no pixel clock change. In this case, both the row read and row read jumping module operate with the same pixel clock.

In the above, many of the functionalities can be carried out in either hardware or software. For example, a processor may be used to carry out the functions of the two clock generating elements, programmed according to the techniques disclosed above.

Other embodiments are also within the disclosed invention. All such modifications are intended to be encompassed within the following claims, in which:

What is claimed is:

1. A controller for producing a rolling shutter to control an image sensor, the controller comprising:
   a row read module, operating in accordance with a first clock speed, the row read module for producing first signals to control an integration beginning of the image sensor, second signals to control an integration ending of the image sensor, and third signals when a pixel clock speed change is required; and
   a row read jumping module, operating in accordance with a second different clock speed, the row read jumping module connected to receive the third signals and for outputting to the row read module fourth signals to control the integration beginning of the image sensor in accordance with the second clock speed.

2. The controller of claim 1, wherein during normal operation the rolling shutter is produced such that integration ending for a current row is synchronized with integration beginning of a next row.

3. The controller of claim 2, wherein during normal operation the row read module produces the second signal for a new row at a same time the row read module produces the first signal for a current row.

4. The controller of claim 1, wherein the row read and row read jumping modules are implemented using a programmed processor.

5. The controller of claim 1, wherein the third signal is generated when a readout pointer reaches a top of a current frame plus an offset.

6. The controller of claim 1, wherein the row read jumping module is disabled once integration beginning in accordance with the second clock speed begins.

7. A controller for producing a rolling shutter to control an image sensor, the controller comprising:
   a first module for producing the rolling shutter and outputting first clock signals to control the image sensor; and
   a second module in communication with the first module, said second module for producing a second clock signal during a time when the rolling shutter is being changed from a first characteristic to a second characteristic, and outputting the second clock signal at a same time as the first clock signals during an interim frame period,
   wherein the first module thereafter uses the second clock signal to produce a new rolling shutter at a rate associated with said second clock signal.

8. The controller of claim 7, wherein the first module activates the second module in response to a request to change the rolling shutter from the first characteristic to the second characteristic.

9. The controller of claim 7, wherein the first module produces the rolling shutter such that an integration time starting signal for a current row in the image sensor is synchronized with an integration time ending signal for a different row in the image sensor.

10. The controller of claim 7, wherein the second module produces signals which cause the integration time starting signal for a current row in the image sensor to be synchronized with a different integration time ending signal for a different row in the image sensor.

11. The controller of claim 10, wherein the rolling shutter includes a readout pointer and a shutter pointer, with a start of each row readout time being established by the shutter pointer.

12. The controller of claim 11, wherein the shutter pointer resets values within a specified row of the image sensor.

13. The controller of claim 7, wherein the first clock signals and the second clock signals operate at different clock speeds.

14. An image sensor comprising:
   an array of image sensing elements; and
   a controller connected to the array and for producing a rolling shutter to control the image sensing elements, the controller comprising:
      a row read module, operating in accordance with a first clock speed, the row read module for producing first signals to control an integration beginning of the image sensor, second signals to control an integration ending of the image sensor, and third signals when a pixel clock speed change is required; and
      a row read jumping module, operating in accordance with a second different clock speed, the row read jumping module connected to receive the third signals and for outputting to the row read module fourth signals to control the integration beginning of the image sensor in accordance with the second clock speed.

15. The image sensor of claim 14, wherein during normal operation the rolling shutter is produced such that integration ending for a current row is synchronized with integration beginning of a next row.

16. The image sensor of claim 15, wherein during normal operation the row read module produces the second signal for a new row at a same time the row read module produces the first signal for a current row.

17. The image sensor of claim 14, wherein the third signal is generated when a readout pointer reaches a top of a current frame plus an offset.

18. The image sensor of claim 14, wherein the row read jumping module is disabled once integration beginning of the image sensor in accordance with the second clock speed begins.

* * * * *